United States Patent
Jeon et al.

(10) Patent No.: US 12,464,381 B2
(45) Date of Patent: Nov. 4, 2025

(54) DEVICE AND METHOD FOR FRONTHAUL TRANSMISSION IN WIRELESS COMMUNICATION SYSTEM

(71) Applicant: Samsung Electronics Co., Ltd., Suwon-si (KR)

(72) Inventors: Namryul Jeon, Suwon-si (KR); Jaeyun Ko, Suwon-si (KR); Daeyoung Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 18/146,219

(22) Filed: Dec. 23, 2022

(65) Prior Publication Data

US 2023/0125913 A1   Apr. 27, 2023

Related U.S. Application Data

(63) Continuation of application No. PCT/KR2022/011276, filed on Aug. 1, 2022.

(30) Foreign Application Priority Data

Jul. 30, 2021   (KR) ........................ 10-2021-0101045

(51) Int. Cl.
*H04W 24/04* (2009.01)
(52) U.S. Cl.
CPC .................................. *H04W 24/04* (2013.01)
(58) Field of Classification Search
CPC ...... H04W 24/04; H04W 88/085; H04L 69/40
See application file for complete search history.

(56) References Cited

U.S. PATENT DOCUMENTS

| | | |
|---|---|---|
| 11,043,998 B2 | 6/2021 | Ahmed et al. |
| 11,477,801 B2 | 10/2022 | Lim et al. |

(Continued)

FOREIGN PATENT DOCUMENTS

| | | |
|---|---|---|
| KR | 10-2021-0043447 A | 4/2021 |
| KR | 10-2021-0051582 A | 5/2021 |

(Continued)

OTHER PUBLICATIONS

International Search Report dated Nov. 10, 2022, issued in International Patent Application No. PCT/KR2022/011276.

(Continued)

*Primary Examiner* — Michael A Keller
(74) *Attorney, Agent, or Firm* — Jefferson IP Law, LLP

(57) ABSTRACT

The disclosure relates to a pre-$5^{th}$-Generation (5G) or 5G communication system to provide for supporting higher data rates beyond a $4^{th}$-Generation (4G) communication system. A method performed by a distributed unit (DU) in a wireless communication system is provided. The method includes transmitting one or more data streams of a message of a control plane or a user plane, which correspond to one or more layers, to a radio unit (RU) through a first fronthaul port, and transmitting a data stream corresponding to an access layer, which is the first layer used for connection of a cell among the one or more layers, to the RU through a second fronthaul port configured between the DU and the RU.

20 Claims, 11 Drawing Sheets

(56) References Cited

U.S. PATENT DOCUMENTS

| | | | |
|---|---|---|---|
| 2016/0174128 A1* | 6/2016 | Oren | ................... H04L 12/4633 |
| | | | 370/328 |
| 2016/0269961 A1 | 9/2016 | Imana | |
| 2016/0323067 A1* | 11/2016 | Jana | ...................... H04L 1/1607 |
| 2017/0244648 A1 | 8/2017 | Tse | |
| 2017/0373890 A1 | 12/2017 | Fertonani et al. | |
| 2019/0289497 A1 | 9/2019 | Rajagopal | |
| 2019/0319765 A1 | 10/2019 | El Mghazli et al. | |
| 2020/0092229 A1 | 3/2020 | Levi et al. | |
| 2020/0235788 A1 | 7/2020 | Rajagopal et al. | |
| 2020/0358575 A1 | 11/2020 | Moon et al. | |
| 2021/0006944 A1 | 1/2021 | Raghothaman et al. | |
| 2021/0136788 A1 | 5/2021 | Lim et al. | |
| 2022/0408390 A1 | 12/2022 | Hiratsuka et al. | |

FOREIGN PATENT DOCUMENTS

| | | | |
|---|---|---|---|
| KR | 10-2021-0064985 A | 6/2021 | |
| WO | 2020/110005 A1 | 6/2020 | |
| WO | 2021/075935 A1 | 4/2021 | |
| WO | 2021/090444 A1 | 5/2021 | |
| WO | WO-2021163180 A1 * | 8/2021 | ............ H04W 16/14 |

OTHER PUBLICATIONS

Extended European Search Report dated Oct. 31, 2024, issued in European Patent Application No. 22849949.7-1215.

* cited by examiner

DEVICE AND METHOD FOR FRONTHAUL TRANSMISSION IN WIRELESS COMMUNICATION SYSTEM

CROSS-REFERENCE TO RELATED APPLICATION(S)

This application is a continuation application, claiming priority under § 365(c), of an International application No. PCT/KR2022/011276, filed on Aug. 1, 2022, which is based on and claims the benefit of a Korean patent application number 10-2021-0101045, filed on Jul. 30, 2021, in the Korean Intellectual Property Office, the disclosure of which is incorporated by reference herein in its entirety.

TECHNICAL FIELD

The disclosure relates to a wireless communication system. More particularly, the disclosure relates to a device and method for fronthaul transmission in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a transmission capacity increases in a wireless communication system, a function split for functionally splitting a base station is being applied. According to the function split, the base station may be divided into a distributed or digital unit (DU) and a radio unit (RU), a fronthaul for communication between the DU and the RU is defined, and transmission through the fronthaul is required. When a failure occurs in a fronthaul port between the DU and the RU, a method for increasing a stability associated with a control plane or a user plane is required.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a device and method for increasing the robustness of a cell service by using another fronthaul (FH) port in a wireless communication system.

Another aspect of the disclosure is to provide a device and method for improving the robustness of a cell service, by mapping a layer related to cell connection to another fronthaul port, when a failure occurs in a fronthaul port in a wireless communication system.

Another aspect of the disclosure is to provide a device and method for increasing the robustness of a cell service by redundantly transmitting one layer among layers for a control plane message or a user plane message to another fronthaul port in a wireless communication system.

Additional aspects will be set forth in part in the description which follows and, in part, will be apparent from the description, or may be learned by practice of the presented embodiments.

Technical Solution

In accordance with an aspect of the disclosure, a method performed by a distributed or digital unit (DU) in a wireless communication system is provided. The method includes transmitting one or more data streams of a message of a control plane or a user plane, which correspond to one or more layers, to a radio unit (RU) through a first fronthaul port, and transmitting a data stream corresponding to an access layer, which is the first layer used for connection of a cell among the one or more layers, to the RU through a second fronthaul port configured between the DU and the RU.

In accordance with another aspect of the disclosure, a method performed by a radio unit (RU) in a wireless communication system is provided. The method includes receiving one or more data streams of a message of a control plane or a user plane, which correspond to one or more layers, from a distributed or digital unit (DU) through a first fronthaul port, and receiving a data stream corresponding to an access layer, which is the first layer used for connection of a cell among the one or more layers, from the DU through a second fronthaul port configured between the DU and the RU.

In accordance with another aspect of the disclosure, a device of a distributed or digital unit (DU) in a wireless communication system is provided. The device includes at least one transceiver, and at least one processor. The at least one transceiver may be configured to transmit one or more data streams of a message of a control plane or a user plane, which correspond to one or more layers, to a radio unit (RU) through a first fronthaul port, and transmit a data stream corresponding to an access layer that is the first layer used for connection of a cell among the one or more layers, to the RU through a second fronthaul port configured between the DU and the RU.

In accordance with another aspect of the disclosure, a device of a radio unit (RU) in a wireless communication system is provided. The device includes at least one transceiver, and at least one processor. The at least one transceiver may be configured to receive one or more data streams of a message of a control plane or a user plane, which correspond to one or more layers, from a distributed or digital unit (DU) through a first fronthaul port, and receive a data stream corresponding to an access layer, which is the first layer used for connection of a cell among the one or more layers, from the DU through a second fronthaul port configured between the DU and the RU.

Advantageous Effects

A device and method of various embodiments of the disclosure may increase the robustness of a cell service by mapping a layer of a control plane or a user plane to another fronthaul, when a failure is detected in a fronthaul port.

A device and method of various embodiments of the disclosure may increase the robustness of a cell service by redundantly transmitting a layer to an additional fronthaul port.

Other aspects, advantages, and salient features of the disclosure will become apparent to those skilled in the art from the following detailed description which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1A:
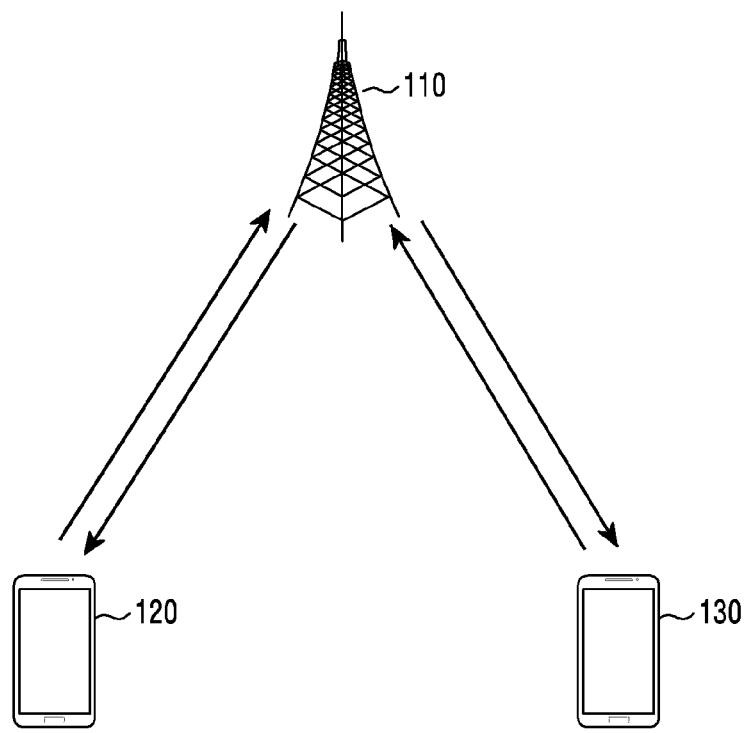
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, a hardware access method will be described as an example. However, since various embodiments of the disclosure include a technology using all of hardware and software, various embodiments of the disclosure do not exclude a software-based access method.

Terms referring to signals (e.g., a message, information, a preamble, a signal, signaling, a sequence, and a stream) used in the following description, terms referring to paths (e.g., a port, a stream, a layer, an RU port, a DU port, a fronthaul (FH) port, an input unit, an output unit, an input end, an output end, and an end), terms referring to resources (e.g., a symbol, a slot, a subframe, a radio frame, a subcarrier, a resource element (RE), a resource block (RB), a bandwidth part (BWP), and an occasion), terms for operation states (e.g., a step, an operation, and a procedure), terms referring to data (e.g., a packet, a user stream, information, a bit, a symbol, and a codeword), terms referring to channels, terms referring to control information (e.g., downlink control information (DCI), a medium access control (MAC) control element (MAC CE), and radio resource control (RRC) signaling), terms referring to network entities, terms referring to components of a device, and the like are exemplified for description's convenience sake. Accordingly, the disclosure is not limited to the terms described below, and other terms having equivalent technical meanings may be used.

Also, in the disclosure, in order to determine whether a specific condition is satisfied or fulfilled, the expression of more than or less than may be used, but this is only a description for expressing one example, and does not exclude a description of equal to or more than, or equal to or less than. A condition described as 'equal to or more than' may be replaced with 'more than', a condition described as 'equal to or less than' may be replaced with 'less than', and a condition described as 'equal to or more than and less than' may be replaced with 'more than and equal to or less than'.

Also, the disclosure describes various embodiments by using terms used in some communication standards (e.g., 3rd generation partnership project (3GPP), extensible radio access network (xRAN), and open-radio access network (O-RAN)). However, this is only an example for description, and various embodiments of the disclosure may be easily modified and applied even in other communication systems.

FIG. 1A illustrates a wireless communication system according to an embodiment of the disclosure.

Referring to FIG. 1A, a base station 110, a terminal 120, and a terminal 130 are exemplified as some of nodes using a wireless channel in the wireless communication system. FIG. 1A illustrates only one base station, but other base stations that are the same as or similar to the base station 110 may be further included.

The base station 110 is a network infrastructure that presents wireless connection to the terminals 120 and 130. The base station 110 has coverage defined as a certain geographic area, based on a distance capable of transmitting a signal. The base station 110 may be referred to as, in addition to base station, an 'access point (AP)', an 'eNodeB (eNB)', a '5th generation node (5G node)', a 'next generation nodeB (gNB)', a 'wireless point', a 'transmission/reception point (TRP)', or other terms having a technical meaning equivalent to these.

Each of the terminal 120 and the terminal 130 is a device used by a user, and performs communication with the base station 110 through a wireless channel. A link from the base station 110 to the terminal 120 or the terminal 130 is referred to as downlink (DL), and a link from the terminal 120 or terminal 130 to the base station 110 is referred to as uplink (UL). Also, the terminal 120 and the terminal 130 may perform communication through a mutual wireless channel. In this case, a device-to-device (D2D) link between the terminal 120 and the terminal 130 is referred to as a sidelink, and the sidelink may be interchangeably used with a PC5 interface. In some cases, at least one of the terminal 120 and the terminal 130 may be operated without user's involvement. That is, at least one of the terminal 120 and the terminal 130 is a device that performs machine type communication (MTC), and cannot be carried by a user. Each of the terminal 120 and the terminal 130 may be referred to as, in addition to terminal, a 'user equipment (UE)', a 'customer premises equipment (CPE)', a 'mobile station', a 'subscriber station', a 'remote terminal', a 'wireless terminal', an 'electronic device', a 'user device', or other terms having a technical meaning equivalent to these.

The base station 110, the terminal 120, and the terminal 130 may perform beamforming. The base station 110 and the terminal 120 or the terminal 130 may transmit and receive radio signals in a relatively low frequency band (e.g., frequency range 1 (FR1) of NR). Also, the base station 110 and the terminal 120 or the terminal 130 may transmit and receive radio signals in a relatively high frequency band (e.g., frequency range 2 (FR2) of NR, and mmWave bands (e.g., 28 GHz, 30 GHz, 38 GHz, and 60 GHz)). In some embodiments, the base station 110 may perform communication with the terminal 130 within a frequency range corresponding to the FR1. In some embodiments, the base station may perform communication with the terminal 120 within a frequency range corresponding to the FR2. In this case, to improve a channel gain, the base station 110, the terminal 120, and the terminal 130 may perform beamforming. Here, the beamforming may include transmit beamforming and receive beamforming. That is, the base station 110, the terminal 120, and the terminal 130 may impart directivity to a transmission signal or a reception signal. To this end, the base station 110 and the terminals 120 and 130 may select serving beams through a beam search or beam management procedure. After the serving beams are selected, subsequent communication may be performed through a resource having a quasi-co-located (QCL) relationship with a resource transmitting the serving beams.

When the large-scale characteristics of a channel carrying a symbol on a first antenna port may be inferred from a channel carrying a symbol on a second antenna port, it may be evaluated that the first antenna port and the second antenna port are in a QCL relationship. For example, widespread characteristics may include at least one of delay spread, Doppler spread, Doppler shift, an average gain, an average delay, a spatial receiver parameter.

Although it is illustrated in FIG. 1A that all of the base station and the terminal perform beamforming, various embodiments of the disclosure are not necessarily limited thereto. In some embodiments, the terminal may or may not perform beamforming. Also, the base station may or may not perform beamforming. That is, only one of the base station and the terminal may perform beamforming, or neither the base station nor the terminal may perform beamforming.

Although the base station 110, the terminal 120, and the terminal 130 are exemplified in FIG. 1A, embodiments of the disclosure may be also applied to an integrated access and backhaul (IAB) node as a newly introduced relay node. The base station-related description described in the disclosure may be applied to a DU of an IAB node, and the terminal-related description described in the disclosure may be applied to a mobile terminal (MT) of the IAB node in the same or similar manner.

In the disclosure, a beam means a spatial flow of a signal in a wireless channel, and is formed by one or more antennas (or antenna elements), and this forming process may be referred to as beamforming. The beamforming may include analog beamforming and digital beamforming (e.g., precoding). A reference signal transmitted based on the beamforming may include, as an example, a demodulation—reference signal (DM-RS), a channel state information-reference signal (CSI-RS), and a synchronization signal/physical broadcast channel (SS/PBCH), and a sounding reference signal (SRS). Also, as a configuration of each reference signal, an IE such as a CSI-RS resource or an SRS-resource, etc. may be used, and this configuration may include information associated with a beam. The information associated with the beam may mean whether a corresponding configuration (e.g., the CSI-RS resource) uses the same spatial domain filter as that of another configuration (e.g., another CSI-RS resource in the same CSI-RS resource set) or uses a different spatial domain filter, or which reference signal is quasi-co-located (QCL), or what QCL type (e.g., QCL type A, B, C, or D) is.

Conventionally, in a communication system in which a cell radius of a base station is relatively large, each base station was installed to have functions of a digital processing unit (or a distributed or digital unit (DU)) and a radio frequency (RF) processing unit (or a radio unit (RU)). However, as a high frequency band is used in 4th generation (4G) and/or later communication systems, and the cell radius of the base station becomes smaller, the number of base stations for covering a specific area was increased, and an operator's burden of an installation cost for installing the increased base stations was increased. To minimize the installation cost of the base station, a structure has been proposed in which a DU and an RU of the base station are separated and one or more RUs are connected to one DU through a wired network, and one or more RUs distributed geographically to cover a specific area are deployed. Hereinafter, examples of a deployment structure, and extension, of the base station of various embodiments of the disclosure are described with reference to FIG. 1B.

Figure 1B:
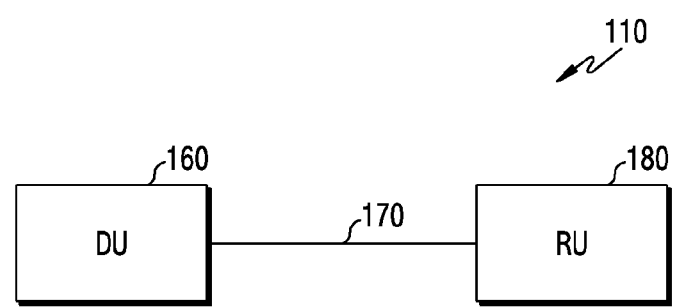
FIG. 1B illustrates an example of a fronthaul structure of a functional split of a base station according to an embodiment of the disclosure.

FIG. 1B illustrates an example of a fronthaul structure being based on a functional split of a base station according to an embodiment of the disclosure.

Figure 5:
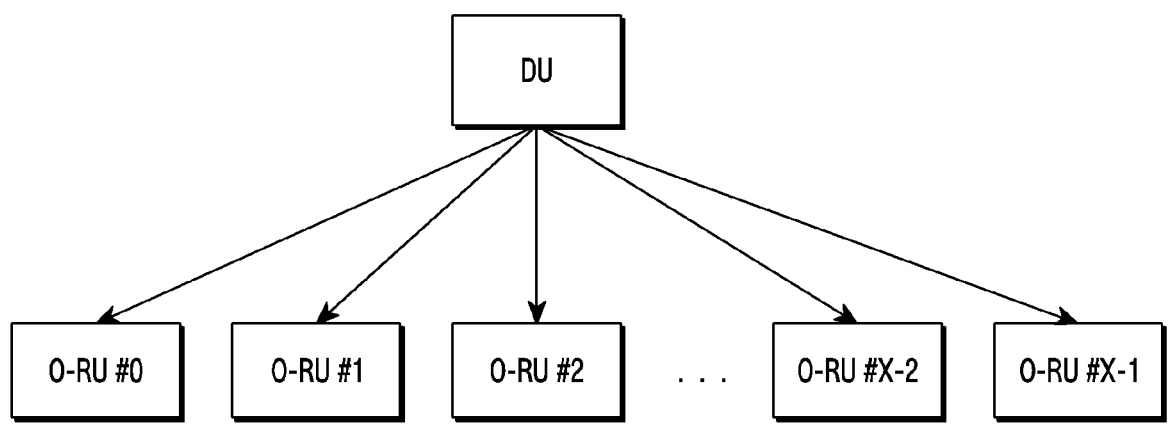
FIG. 5 illustrates an example of a connection relationship between a DU and RUs according to an embodiment of the disclosure.

Unlike backhaul between the base station and a core network, fronthaul refers to between entities between a wireless local area network (WLAN) and the base station. FIG. 1B shows an example of a fronthaul structure between a DU 160 and an RU 180, but this is only for description's convenience sake and the disclosure is not limited thereto. In other words, an embodiment of the disclosure may be applied even to a fronthaul structure between one DU and a plurality of RUs as shown in FIG. 5. For example, an embodiment of the disclosure may be applied to a fronthaul structure between one DU and two RUs. Also, an embodiment of the disclosure may be applied even to a fronthaul structure between one DU and three RUs.

Referring to FIG. 1B, a base station 110 may include a DU 160 and an RU 180. A fronthaul 170 between the DU 160 and the RU 180 may be operated through an Fx interface. For an operation of the fronthaul 170, for example, an interface such as an enhanced common public radio interface (eCPRI) or a radio over ethernet (ROE) may be used.

As a communication technology develops, mobile data traffic increases, and accordingly, a bandwidth requirement required for a fronthaul between a digital unit (DU) and a radio unit (RU) has greatly increased. In a deployment such as a centralized/cloud radio access network (C-RAN), the DU performs functions for packet data convergence protocol (PDCP), radio link control (RLC), media access control (MAC), and physical (PHY), and the RU may be implemented to further perform functions for a PHY layer in addition to a radio frequency (RF) function.

The DU 160 may take charge of an upper layer function of a wireless network. For example, the DU 160 may perform a function of an MAC layer and/or a part of a PHY layer. Here, the part of the PHY layer is performed at a higher stage among functions of the PHY layer and, for example, may include channel encoding (or channel decoding), scrambling (or descrambling), modulation (or demodulation), layer mapping (or layer demapping). According to an embodiment, when the DU 160 complies with an O-RAN standard, the DU 160 may be referred to as an O-DU (O-RAN DU). According to need, the DU 160 may be replaced with and expressed as a first network entity for the base station (e.g., gNB) in embodiments of the disclosure.

The RU 180 may take charge of a lower layer function of the wireless network. For example, the RU 180 may perform a part of the PHY layer and/or an RF function. Here, the part of the PHY layer is performed at a relatively lower stage than that of the DU 160 among the functions of the PHY layer and, for example, may include an inverse fast Fourier transform (IFFT) transformation (or a fast Fourier transform (FFT) transformation), CP insertion (CP removal), and/or digital beamforming. An example of this concrete function split is described in detail in FIG. 4. The RU 180 may be referred to as an 'access unit (AU)', an 'access point (AP)', a 'transmission/reception point (TRP)', a 'remote radio head (RRH)', a 'radio unit (RU)' or other terms having a technical meaning equivalent to these. According to an embodiment, when the RU 180 complies with the O-RAN standard, the RU 180 may be referred to as an O-RU (O-RAN RU). According to need, the DU 120 may be replaced with and expressed as a second network entity for the base station (e.g., gNB) in embodiments of the disclosure.

Although FIG. 1B describes that the base station includes the DU and the RU, various embodiments of the disclosure are not limited thereto. In some embodiments, the base station may be implemented as a distributed deployment that is based on a centralized unit (CU) configured to perform a function of an upper layer (e.g., packet data convergence protocol (RRC)) of an access network and a distributed or digital unit (DU) configured to perform a function of a lower layer. In this case, the distributed or digital unit (DU) may include the digital unit (DU) and the radio unit (RU) of FIG. 1B. Between a core (e.g., 5G core (5GC) or next generation core (NGC)) network and a radio network (RAN), the base station may be implemented in a structure in which the CU, the DU, and the RU are deployed in order. An interface between the CU and the distributed or digital unit (DU) may be referred to as an F1 interface.

The centralized unit (CU) may be connected to one or more DUs, and may take charge of a function of a higher layer than that of the DU. For example, the CU may take charge of functions of radio resource control (RRC) and packet data convergence protocol (PDCP) layers, and the DU and the RU may take charge of functions of a lower layer. The DU may perform radio link control (RLC), media access control (MAC), and some functions (high PHY) of a physical (PHY) layer, and the RU may take charge of the remaining functions (low PHY) of the PHY layer. Also, as an example, the digital unit (DU) may be included in the distributed or digital unit (DU) according to a distributed deployment implementation of a base station. Hereinafter, operations of the digital unit (DU) and the RU are described unless otherwise defined. However, various embodiments of the disclosure may be applied to all of a base station deployment including the CU or a deployment in which the DU is directly connected to a core network (that is, the CU and the DU are integrated into the base station (e.g., NG-RAN node) being one entity and are implemented).

Figure 2:
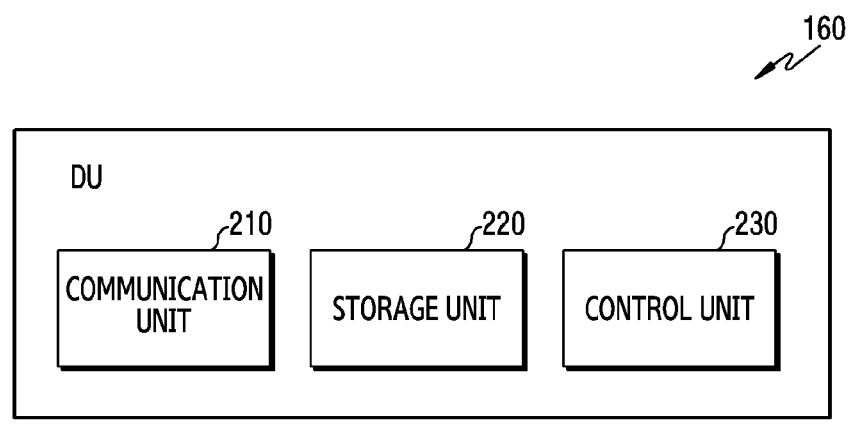
FIG. 2 illustrates a construction of a distributed or digital unit (DU) according to an embodiment of the disclosure.

FIG. 2 illustrates a construction of a digital unit (DU) in a wireless communication system according to an embodiment of the disclosure.

The construction illustrated in FIG. 2 may be understood as a construction of the DU 160 of FIG. 1B that is a part of the base station. Terms such as '... unit' and '... er' used below mean a unit that processes at least one function or operation, and this may be implemented as hardware, software, or a combination of hardware and software.

Referring to FIG. 2, a DU 160 includes a communication unit 210, a storage unit 220, and a control unit 230.

The communication unit 210 may perform functions for transmitting and receiving signals in a wired communication environment. The communication unit 210 may include a wired interface for controlling a direct connection between a device and a device through a transmission medium (e.g., a copper wire and an optical fiber). For example, the communication unit 210 may transmit an electrical signal to another device through a copper wire, or perform conversion between an electrical signal and an optical signal. The communication unit 210 may be connected to a radio unit (RU). The communication unit 210 may be connected to a core network or be connected to a CU of a distributed deployment.

The communication unit 210 may perform functions for transmitting and receiving signals in a wireless communication environment as well. For example, the communication unit 210 may perform a function of converting a baseband signal and a bit stream according to a physical layer standard of a system. For example, when transmitting data, the communication unit 210 provides complex symbols by encoding and modulating a transmitted bit stream. Also, when receiving data, the communication unit 210 restores a received bit stream by demodulating and decoding a baseband signal. Also, the communication unit 210 may include a plurality of transmission/reception paths. Also, in accordance with an embodiment, the communication unit 210 may be connected to a core network or be connected to other nodes (e.g., integrated access backhaul (IAB)).

The communication unit 210 may transmit and/or receive signals. To this end, the communication unit 210 may include at least one transceiver. For example, the communication unit 210 may transmit a synchronization signal, a reference signal, system information, a message, a control message, a stream, control information, or data, etc. Also, the communication unit 210 may perform beamforming.

The communication unit 210 transmits and receives signals as described above. Accordingly, all or part of the communication unit 210 may be referred to as a 'transmitter', a 'receiver', or a 'transceiver'. Also, in the following description, transmission and reception performed through a wireless channel are used as a meaning including that the above-described processing is performed by the communication unit 210.

Although not shown in FIG. 2, the communication unit 210 may further include a backhaul communication unit for connecting to a core network or another base station. The backhaul communication unit presents an interface for communicating with other nodes in a network. That is, the backhaul communication unit converts a bit stream transmitted from the base station to another node, for example, another connection node, another base station, an upper node, a core network, etc., into a physical signal, and converts a physical signal received from another node, into a bit stream.

The storage unit 220 stores data such as a basic program, an application program, and setting information, etc. for an operation of the DU 160. The storage unit 220 may include a memory. The storage unit 220 may be constructed as a volatile memory, a non-volatile memory, or a combination of a volatile memory and a non-volatile memory. Also, the storage unit 220 presents the stored data according to a request of the control unit 230.

The control unit 230 controls overall operations of the DU 160. For example, the control unit 230 transmits and receives signals through the communication unit 210 (or through the backhaul communication unit). Also, the control unit 230 writes data in the storage unit 220, and reads. Also, the control unit 230 may perform functions of a protocol stack required by the communication standard. To this end, the control unit 230 may include at least one processor.

The construction of the DU 160 shown in FIG. 2 is only one example, and an example of the DU 160 performing various embodiments of the disclosure from the construction shown in FIG. 2 is not limited. According to various embodiments, some constructions may be added, deleted, or changed.

Figure 3:
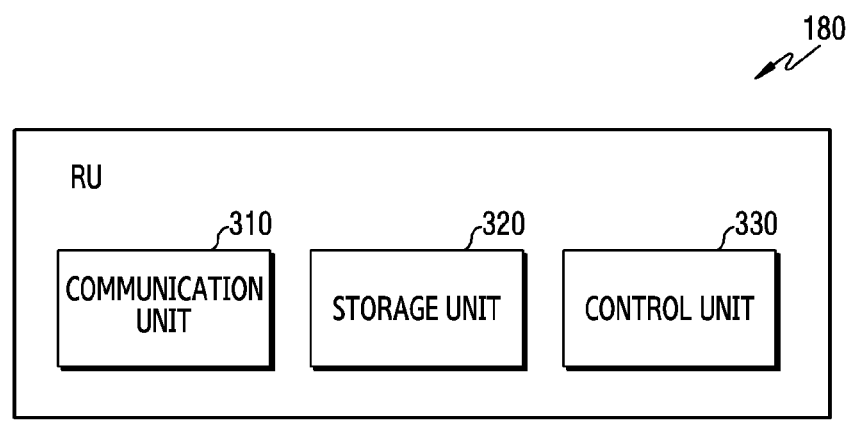
FIG. 3 illustrates a construction of a radio unit (RU) according to an embodiment of the disclosure.

FIG. 3 illustrates a construction of a radio unit (RU) in a wireless communication system according to an embodiment of the disclosure.

The construction illustrated in FIG. 3 may be understood as a construction of the RU 180 of FIG. 1B that is a part of the base station. Terms such as ' . . . unit' and ' . . . er' used below mean a unit that processes at least one function or operation, and this may be implemented as hardware or software, or a combination of hardware and software.

Referring to FIG. 3, an RU 180 includes a communication unit 310, a storage unit 320, and a control unit 330.

The communication unit 310 performs functions for transmitting and receiving signals through a wireless channel. For example, the communication unit 310 up converts a baseband signal into an RF band signal and transmits the signal through an antenna, and down converts an RF band signal received through the antenna into a baseband signal. For example, the communication unit 310 may include a transmission filter, a reception filter, an amplifier, a mixer, an oscillator, a digital to analog converter (DAC), an analog to digital converter (ADC), and the like.

Also, the communication unit 310 may include a plurality of transmission/reception paths. Further, the communication unit 310 may include an antenna unit. The communication unit 310 may include at least one antenna array composed of a plurality of antenna elements. In terms of hardware, the communication unit 310 may include a digital circuit and an analog circuit (e.g., a radio frequency integrated circuit (RFIC)). Here, the digital circuit and the analog circuit may be implemented as one package. Also, the communication unit 310 may include a plurality of RF chains. The communication unit 310 may perform beamforming. To give a directionality being based on the setting of the control unit 330 to a signal to be transmitted/received, the communication unit 310 may apply a beamforming weight to the signal. According to an embodiment, the communication unit 310 may include a radio frequency (RF) block (or an RF unit).

Also, the communication unit 310 may transmit and/or receive signals. To this end, the communication unit 310 may include at least one transceiver. The communication unit 310 may transmit a downlink signal. The downlink signal may include a synchronization signal (SS), a reference signal (RS) (e.g., a cell-specific reference signal (CRS) and/or demodulation (DM)-RS)), system information (e.g., MIB, SIB, remaining system information (RMSI), and/or other system information (OSI)), a configuration message, control information, or downlink data, etc. Also, the communication unit 310 may receive an uplink signal. The uplink signal may include a random access-related signal (e.g., a random access preamble (RAP) (or message 1 (Msg1), and/or message 3 (Msg3)), a reference signal (e.g., a sounding reference signal (SRS), and/or DM-RS), or a power headroom report (PHR), etc.

The communication unit 310 transmits and receives signals as described above. Accordingly, all or part of the communication unit 310 may be referred to as a 'transmitter', a 'receiver', or a 'transceiver'. Also, in the following description, transmission and reception performed through a wireless channel are used as a meaning including that the above-described processing is performed by the communication unit 310.

The storage unit 320 stores data such as a basic program, an application program, and setting information, etc. for an operation of the RU 180. The storage unit 320 may be configured as a volatile memory, a non-volatile memory, or a combination of a volatile memory and a non-volatile memory. Also, the storage unit 320 presents the stored data according to a request of the control unit 330. According to an embodiment, the storage unit 320 may include a memory for a condition, a command, or a setting value which is related to an SRS transmission scheme.

The control unit 330 controls overall operations of the RU 180. For example, the control unit 330 transmits and receives signals through the communication unit 310. Also, the control unit 330 writes data in the storage unit 320, and reads. In addition, the control unit 330 may perform functions of a protocol stack required by the communication standard. To this end, the control unit 330 may include at least one processor. In some embodiments, the control unit 330 may be configured to transmit an SRS to the DU 160, based on an antenna number. Also, in some embodiments, the control unit 330 may be configured to transmit the SRS to the DU 160 after uplink transmission. The condition, command or set value being based on the SRS transmission scheme is an instruction set or code stored in the storage unit 320, and may be an instruction/code at least temporarily resided in the control unit 330 or be a part of a storage space storing the instruction/code or circuitry constituting the control unit 330. Also, the control unit 330 may include various modules for performing communication. According to various embodiments, the control unit 330 may control the RU 180 to perform operations of various embodiments described later.

Figure 4:
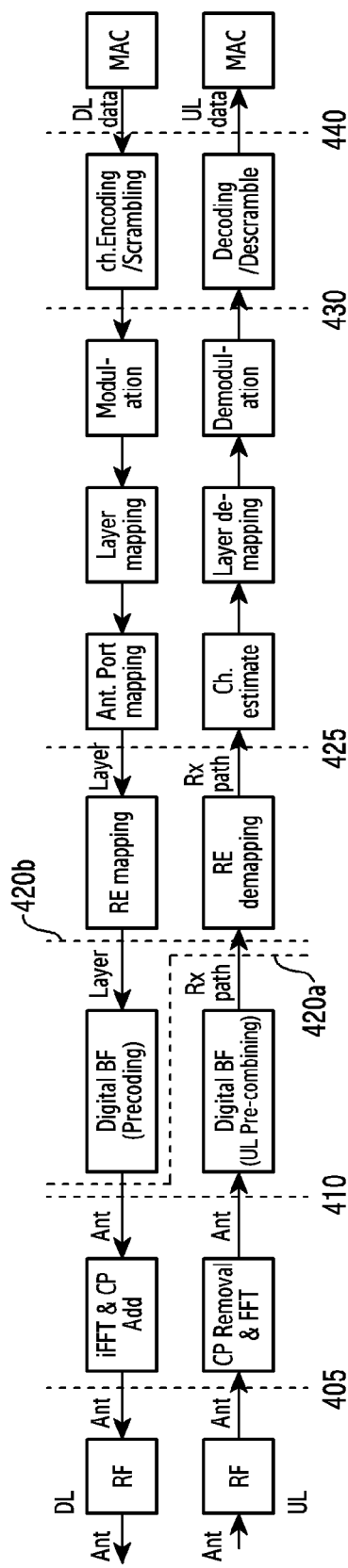
FIG. 4 illustrates an example of a function split according to an embodiment of the disclosure.

FIG. 4 illustrates an example of a function split in a wireless communication system according to an embodiment of the disclosure.

As a wireless communication technology develops (e.g., the introduction of a 5th generation (5G) communication system (or a new radio (NR) communication system)), a frequency band used has increased more and more, and as a cell radius of a base station becomes very smaller, the number of RUs required has further increased. Also, in the 5G communication system, a quantity of data transmitted has increased by 10 times or more, and a transmission capacity of a wired network transmitted to a fronthaul has greatly increased. Because of these factors, in the 5G communication system, an installation cost of the wired network may be greatly increased. Accordingly, in order to lower the transmission capacity of the wired network and reduce the installation cost of the wired network, technologies for lowering the transmission capacity of the wired network transmitted to the fronthaul by imputing some functions of a modem of a DU to an RU have been proposed, and these technologies may be referred to as a 'function split'.

A method of extending a role of an RU taking charge of only an RF function to a partial function of a physical layer in order to reduce a burden of a DU is considered. In this case, as the RU performs functions of a higher layer, a throughput of the RU may increase and thus a transmission bandwidth in the fronthaul may increase, and at the same time, a delay time requirement constraint caused by response processing may be lowered. On the other hand, as the RU performs the functions of the higher layer, a virtualization gain decreases and a size/weight/cost of the RU increases. It is required to implement an optimal function split in consideration of the trade-off of the advantages and disadvantages described above.

Referring to FIG. 4, function splits in a physical layer below a MAC layer are illustrated. In the case of downlink (DL) transmitting a signal to a terminal through a wireless network, a base station may sequentially perform channel encoding/scrambling, modulation, layer mapping, antenna mapping, RE mapping, digital beamforming (e.g., precoding), IFFT transformation/CP insertion, and RF conversion. In the case of uplink (UL) receiving a signal from a terminal through the wireless network, the base station may sequentially perform RF conversion, FFT transformation/CP removal, digital beamforming (pre-combining), RE demapping, channel estimation, layer demapping, demodulation, and decoding/descrambling. The split of uplink functions and downlink functions may be defined in various types by a necessity between vendors, a discussion on standards, etc. according to the above-described trade-off.

A first function split 405 may be the split of an RF function and a PHY function. The first function split is a case in which the PHY function within an RU is not substantially implemented, and may be referred to as, for example, Option 8. A second function split 410 allows the RU to perform IFFT transformation/CP insertion in DL of the PHY function and FFT transformation/CP removal in UL, and allows the DU to perform the remaining PHY functions. As an example, the second function split 410 may be referred to as Option 7-1. A third function split 420a allows the RU to perform IFFT transformation/CP insertion in DL of the PHY function and FFT transformation/CP removal and digital beamforming in UL, and allows the DU to perform the remaining PHY functions. As an example, the third function split 420a may be referred to as Option 7-2x Category A. A fourth function split 420b allows the RU to perform even digital beamforming in all of DL and UL, and the DU to perform higher PHY functions after the digital beamforming. As an example, the fourth function split 420b may be referred to as Option 7-2x Category B. A fifth function split 425 allows the RU to perform even RE mapping (or RE demapping) in all of DL and UL, and the DU to perform higher PHY functions after the RE mapping (or the RE demapping). As an example, the fifth function split 425 may be referred to as Option 7-2. A sixth function split 430 allows the RU to perform modulation (or demodulation) in all DL and UL, and the DU to perform subsequent higher PHY functions until the modulation (or the demodulation). As an example, the sixth function split 430 may be referred to as Option 7-3. A seventh function split 440 allows the RU to perform even encoding/scrambling (or decoding/descrambling) in all of the DL and UL, and the DU to perform subsequent higher PHY functions until the modulation (or the demodulation). As an example, the seventh function split 440 may be referred to as Option 6.

According to an embodiment, when large-capacity signal processing such as in FR1 MMU is expected, a function split (e.g., the fourth function split 420b) in a relatively high layer may be required in order to reduce a fronthaul capacity. Also, because a function split (e.g., the sixth function split 430) in a too high layer may cause a burden on RU implementation in that a control interface becomes complicated and a plurality of PHY processing blocks are included within the RU, an appropriate function split may be required depending on a deployment and implementation scheme of the DU and the RU.

According to an embodiment, when the RU cannot process the precoding of data received from the DU (that is, when there is a limit to a precoding capability of the RU), the third function split 420a or a lower function split (e.g., the second function split 410) may be applied. To the contrary, when the RU has an ability to process the precoding of data received from the DU, the fourth function split 420b or a higher function split (e.g., the sixth function split 430) may be applied. Hereinafter, embodiments of the disclosure are described with a criterion of the third function split 420a (category A) or fourth function split 420b (category B) for performing the beamforming processing in the RU, unless otherwise limited. However, this does not exclude the configuration of an embodiment through other function splits. Functional configuration, signaling, or operation of FIG. 5 to FIG. 10 described later may be applied not only to the third function split 420a or the fourth function split 420b but also to other function splits.

In embodiments of the disclosure, eCPRI and O-RAN standards are exemplified and described as fronthaul interfaces when a message is transmitted between a DU (e.g., the DU 160 of FIG. 1B) and an RU (e.g., the RU 180 of FIG. 1B). An eCPRI header, an O-RAN header, and additional fields may be included in an Ethernet payload of the message. Hereinafter, various embodiments of the disclosure are described using standard terms of eCPRI or O-RAN, but other expressions having the same meaning as each term may be used instead in various embodiments of the disclosure.

As a transport protocol of fronthaul, Ethernet and eCPRI easy to share with a network may be used. The eCPRI header and the O-RAN header may be included in an Ethernet payload. The eCPRI header may be located in a front end of the Ethernet payload. The contents of the eCPRI header are as follows.

ecpriVersion (4 bits): 0001b (fixed value)
ecpriReserved (3 bits): 0000b (fixed value)
ecpriConcatenation (1 bit): 0b (fixed value)
ecpriMessage (1 byte): Message type
ecpriPayload (2 bytes): Payload size in bytes
ecpriRtcid/ecpriPcid (2 bytes): x, y, z can be configured through a management plane (M-plane). A corresponding field may indicate a transmission path (extended antenna-carrier (eAxC) in eCPRI) of a control message of various embodiments during multi-layer transmission.
CU_Port_ID (x bits): Classifying a channel card. Classification possible including a modem (2 bits for channel card, 2 bits for Modem)
BandSector_ID (y bits): Classified according to Cell/Sector
CC_ID (z bits): Classified according to component carrier
RU_Port_ID (w bits): Classified according to layer, T, antenna, etc.
ecpriSeqid (2 bytes): Sequence ID is managed for each ecpriRtcid/ecpriPcid, and sequence ID and subsequence ID are separately managed. Radio-transport-level fragmentation is possible when using subsequence ID (different from application-level fragmentation)

An application protocol of fronthaul may include a control plane (C-plane), a user plane (U-plane), a synchronization plane (S-plane), and a management plane (M-plane).

The control plane may be configured to present scheduling information and beamforming information through a control message. The user plane may include user's downlink data (IQ data or synchronization signal block (SSB)/RS), uplink data (IQ data or SRS/RS), or physical random access channel (PRACH) data. A weight vector of the above-described beamforming information may be multiplied by the user's data. The synchronization plane may be related to timing and synchronization. The management plane may be related to initial setup, non-real time reset or reset, and non-real time report.

To define the type of message transmitted in the control plane, Section Type is defined. Section Type may indicate the use of a control message transmitted in the control plane. For example, a use for each Section Type is given as follows.
sectionType=0: DL idle/guard periods—Used for Tx blanking for power saving
sectionType=1: Mapping a BF index or weight (O-RAN mandatory BF scheme) to RE of a DL/UL channel
sectionType=2: reserved
sectionType=3: Mapping a beamforming index or weight to RE of a PRACH and mixed-numerology channel
sectionType=4: reserved
sectionType=5: Delivering UE scheduling information wherein the RU may determine a real-time BF weight (O-RAN optional BF scheme)
sectionType=6: Transmitting UE channel information periodically wherein the RU may determine a real-time BF weight (O-RAN optional BF scheme)
sectionType=7: used for LAA support FIG. 5 illustrates an example of connection between a DU and RUs according to an embodiment of the disclosure.

Referring to FIG. 5, a DU may be connected to one or more RUs. The DU may be connected to a plurality of RUs. In this case, the RU follows the O-RAN standard and thus, may be referred to as an O-RU. The DU may be connected to X O-RUs. The DU may be connected to O-RU #0, O-RU #1, O-RU #2, . . . , to O-RU #X−1. According to an embodiment, all the O-RUs may present the same cell. According to an embodiment, at least some of the O-RUs may present a cell, and other at least some of the O-RUs may present another cell as well. In this case, the DU may be connected to each RU through a fronthaul interface. A physical path between the DU and the RU may be referred to as a fronthaul (FH) port. The DU may be connected to each RU through one or more FH ports. According to an embodiment, the DU may be connected to the RU through a plurality of FH ports.

Figure 6:
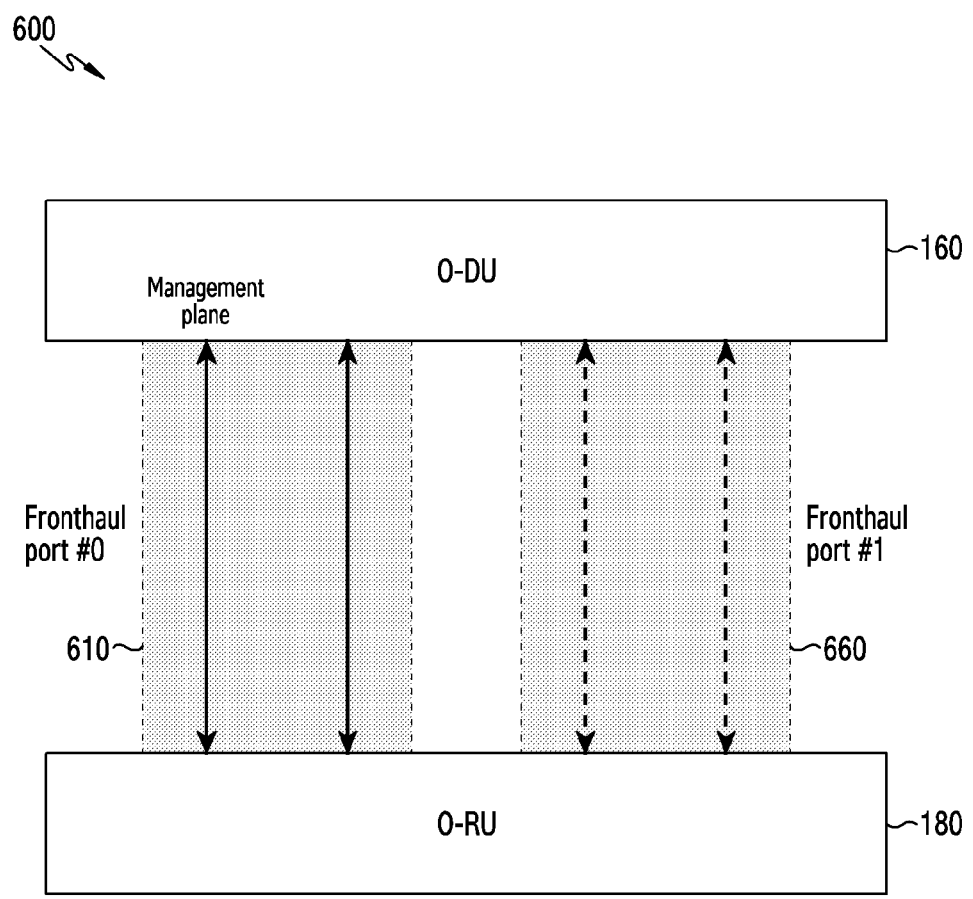
FIG. 6 illustrates an example of a recovery operation in a management plane (M-plane) according to an embodiment of the disclosure.

FIG. 6 illustrates an example of a recovery operation in a management plane (M-plane) according to an embodiment of the disclosure.

Here, the recovery operation refers to an operation of using another fronthaul port in order to continue communication when a fronthaul port is dropped (or down). To indicate that it is possible to apply the O-RAN standard, an O-DU and an O-RU are described as examples, but it is undoubted that embodiments of the disclosure may be applied even to a DU and an RU.

Referring to FIG. 6, in example 600 of a recovery operation in an M-plane, a plurality of fronthaul ports may be configured between a DU 160 and an RU 180. The plurality of fronthaul ports may include a fronthaul port #0 (610) and a fronthaul port #1 (660). The fronthaul port refers to a physical path along a fronthaul interface between the DU 160 and the RU 180.

When the plurality of fronthaul ports are operated between the DU 160 and the RU 180, that is, when multiple fronthaul ports are operated, a management plane or a synchronization plane is operated through one path. For example, when a message of the management plane or the synchronization plane is transmitted in a primary path and the primary path goes down, switching may be performed to make available another path. The message in the management plane or synchronization plane is again transmitted via the path through the switching. Like this, multiplexing may be implemented through switching and restoration.

On the other hand, unlike the management plane and the synchronization plane, in a control plane or a user plane, a recovery method has not been defined. Also, it is required to minimize a call drop in the control plane and the user plane, and consider a relationship between a plurality of layers and RU ports. Hereinafter, embodiments of the disclosure propose an operation for more robustly servicing a cell in the control plane and the user plane when the plurality of fronthaul ports are operated between the DU 160 and the RU 180.

Figure 7:
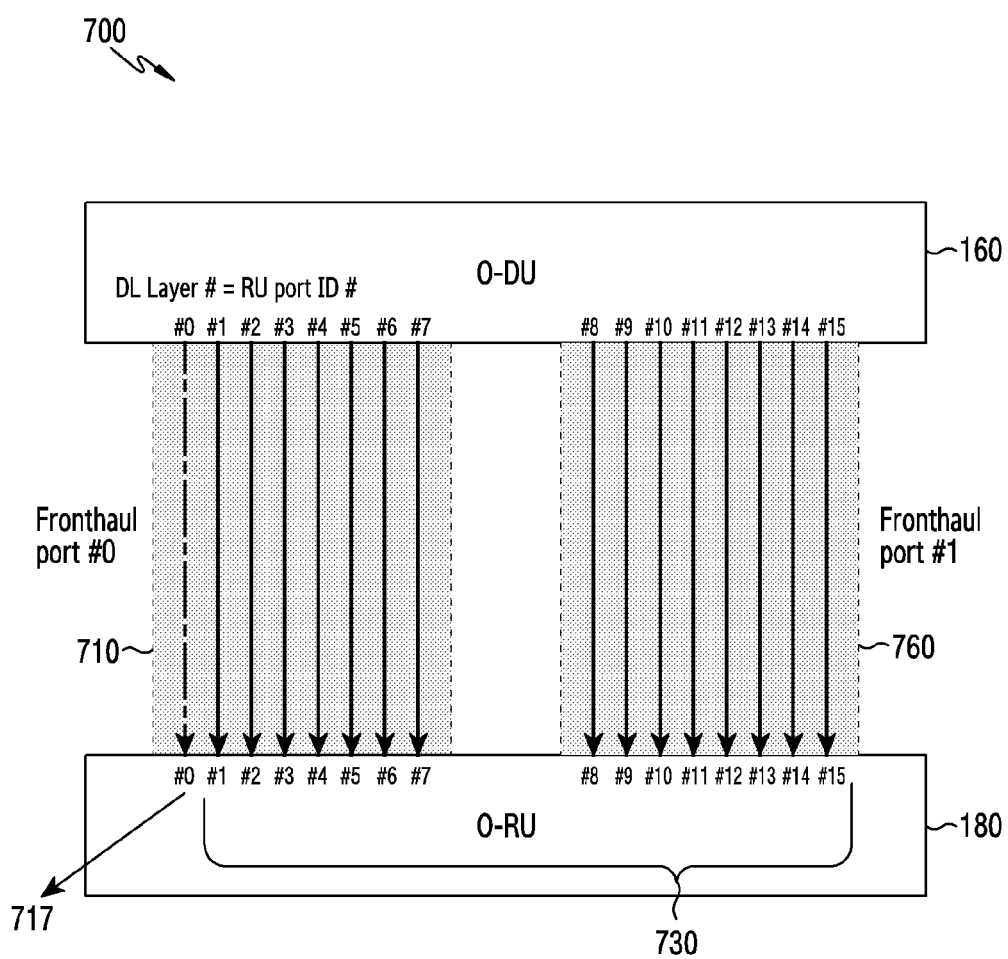
FIG. 7 illustrates an example of a plurality of fronthaul ports constructed for a control plane (C-plane) or a user plane (U-plane) according to an embodiment of the disclosure.

FIG. 7 illustrates an example of a plurality of fronthaul ports constructed for a control plane (C-plane) or a user plane (U-plane) according to an embodiment of the disclosure.

In the disclosure, downlink is described as an example in order to describe a recovery of the fronthaul port and a redundancy transmission operation, but the same technical principle may be applied to uplink in a similar scheme. Also, to indicate that it is possible to apply an O-RAN standard, an O-DU and an O-RU are described as examples, but it is undoubted that embodiments of the disclosure may be applied even to a DU and an RU.

Referring to FIG. 7, in example 700 of a plurality of fronthaul ports, a plurality of fronthaul ports may be configured between a DU 160 and an RU 180. As an example, the RU 180 may be the O-RU of category B of FIG. 4 for MIMO. The plurality of fronthaul ports may include a fronthaul port #0 (710) and a fronthaul port #1 (760). The fronthaul port refers to a physical path along a fronthaul interface between the DU 160 and the RU 180. The fronthaul port may include one or more layer paths.

In the disclosure, a layer may be an element for a stream configured for an MIMO operation, that is, a spatial stream. The spatial stream may mean a data flow in DL associated with precoded data (which may be the same as or different from layers when there is extension in precoding) and in UL associated with the number of outputs of digital beamforming (sometimes referred to as a "beam"). In a layer unit (i.e., a layer ID unit), a DU may deliver information being based on each stream, to an RU through a corresponding RU port.

The layer path may mean a path on a fronthaul interface through which a spatial stream is transmitted. The layer path may mean an RU port. The layer path may correspond to a logical flow such as a data layer or a spatial stream. According to an embodiment, the data layer or the spatial stream may correspond to a control plane message or a user plane message. One layer path may be associated with one spatial stream. One layer path may be associated with one RU port ID.

The layer path in the disclosure may be the unit of a signal flow spatially distinguishable. According to an embodiment, a layer may be associated with an antenna (or an antenna port) of a terminal. According to an embodiment, the layer path may correspond to an extended antenna-carrier (eAxC) in eCPRI. The eAxC may refer to a data flow per antenna per carrier in a sector. In other words, a transmission path (or reception path) of the layer may correspond to an extended antenna-carrier (eAxC) in eCPRI. The eAxC may refer to a data flow per antenna per carrier in a sector. According to an embodiment, the DU 160 may transmit a control plane message or a user plane message for a total of N layers, to the RU 180. The DU 160 may identify the layer path for message transmission. The RU 180 may receive a message through the layer path. Layers transmitted to a terminal in a cell serviced by the RU 180 may be mapped to RU ports, respectively.

According to an embodiment, one fronthaul port may support up to 8 layer paths. Each layer path may correspond to one RU port ID. Each layer path may correspond to one data layer. For example, downlink (DL) layers #0 to #15 may correspond to RU port IDs #0 to #15, respectively. The RU port IDs #0 to #7 may be associated with the fronthaul port #0 (710). The RU port IDs #8 to #15 may be associated with the fronthaul port #1 (760). FIG. 7 shows an example in which 16 downlink layers are mapped to 25 Gbps×2 ports in a bandwidth of 100 MHz.

According to embodiments of the disclosure, a default layer may be defined. The default layer means a layer related to cell connection. The default layer may be referred to as an access layer. An RU port ID corresponding to the default layer may be referred to as a default RU port ID. Among layer paths of a fronthaul port, a layer path corresponding to the default layer may be referred to as a default layer path. According to an embodiment, when a terminal initially connects to a cell of a base station, the terminal may perform a connection procedure by using one antenna. In this case, an RU port of the base station corresponding to the used antenna of the terminal may be referred to as a default layer. According to an embodiment, the RU 180 may transmit system information (e.g., MIB, SIB1) in a single stream. The system information may be presented from the DU 160 to the RU 180. The presented system information may be presented from the DU 160 to the RU 180 through the default layer path of the fronthaul port.

To provide a high data rate while servicing a cell, the number of transport streams may be increased. However, as described above, when a terminal connects to the cell or only a relatively low data rate is required, only the RU port corresponding to the default layer may be operated. In other words, minimum information necessary for maintaining a cell connection and a cell service is delivered through the RU port corresponding to the default layer. For example, the minimal information essential for the cell service may be transmitted on an RU port #0. For example, the RU port #0 (717) may be related to at least one of a physical downlink control channel (PDCCH), a synchronization signal/physical broadcast channel (SS/PBCH) synchronization signal block (SSB), a physical downlink shared channel (PDSCH) layer #0, a cell-specific reference signal (CRS) port #0, and a channel state information-reference signal (CSI-RS) port #15 (in the case of NR, a port #3000). On the other hand, other RU ports (e.g., the RU port #1 to RU port #15 (730)) than the default layer path may be related to PDSCH layers #1 to #15, CRS ports #1 to #3, and CSI-RSs other than port #15 (in the case of NR, the port #3000).

A failure may occur in the fronthaul port #0 (710). For example, the fronthaul port #0 (710) may be dropped (or down) due to a problem caused by an excessive capacity. Also, for example, an electrical connection between the DU 160 and the RU 180 through the fronthaul port #0 (710) may be cut off due to a facility problem or a physical problem in the fronthaul port #0 (710). When the fronthaul port #0 (710) is disconnected, a cell service becomes impossible. When the fronthaul port #1 (760) is disconnected, it becomes impossible to allocate the layers #8 to #15 to all terminals of a cell, so a maximum throughput is reduced but the cell service may be maintained. Accordingly, when the RU port #0 (717) is disconnected, a more robust cell service may be presented by presenting a cell service through another fronthaul port (e.g., the fronthaul port #1). According to embodiments of the disclosure, the DU 160 may be configured to present the first endpoint (corresponding to the default layer) of the fronthaul port #0 at the fronthaul port #1 when the fronthaul port #0 is disconnected. Hereinafter, operations for a fronthaul port recovery and a redundancy transmission of a layer for each fronthaul for presenting a robust cell service are described with reference to FIGS. 8 to 10.

Figure 8:
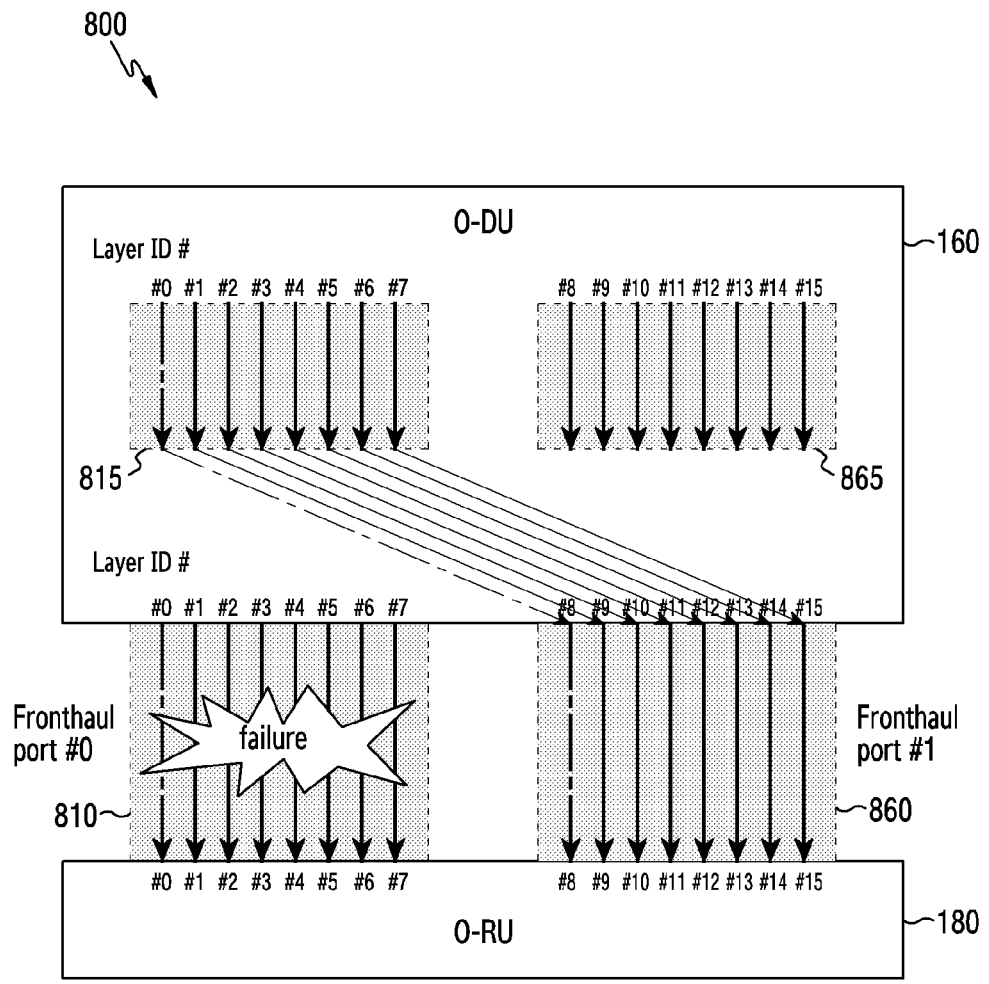
FIG. 8 illustrates an example of a fronthaul port recovery according to an embodiment of the disclosure.

FIG. 8 illustrates an example of a fronthaul port recovery according to an embodiment of the disclosure.

Referring to FIG. 8, in example 800 of a fronthaul port recovery, an operation of a fronthaul recovery mapping layers presented at a fronthaul port #0 to endpoints of a fronthaul port #1 after a DU detects that the fronthaul port #0 is down, is described. In FIG. 8, the fronthaul port #1 is exemplified as a port for replacing the fronthaul port #0 in a situation in which two fronthauls are configured between the DU and an RU, but embodiments of the disclosure are not limited thereto. A recovery operation of mapping to endpoints of a fronthaul port (e.g., a fronthaul port #2) different from the fronthaul port #0 in a situation where three or more fronthauls are configured between the DU and the RU may be also understood as an embodiment of the disclosure.

Referring to FIG. 8, a plurality of fronthaul ports may be configured between a DU 160 and an RU 180. As an example, the RU 180 may be the O-RU of category B of FIG. 4 for MIMO. The plurality of fronthaul ports may include a fronthaul port #0 (810) and a fronthaul port #1 (860). The fronthaul port refers to a physical path along a fronthaul interface between the DU 160 and the RU 180. The fronthaul port may include one or more layer paths.

A failure may occur in the fronthaul port #0 (810). The DU 160 may detect the failure of the fronthaul port #0 (810). When the failure is detected in the fronthaul port #0 (810), the DU 160 may identify another fronthaul port. The DU 160 may identify another fronthaul port connected to the RU 180. The DU 160 may identify the fronthaul port #1 (860).

The DU 160 may map layers to the identified fronthaul port. Here, the layers may be streams corresponding to a control plane message or a user plane message. The DU 160 may map layers (e.g., layer IDs #0 to #7 (815)) corresponding to the existing fronthaul port #0 (810) among layers received from an upper layer, to endpoints of the fronthaul port #1. According to this mapping, it may be difficult to service layers (e.g., layer IDs #8 to #15 (865)) corresponding to the fronthaul port #1 (860).

As shown in FIG. 8, since a service that could be presented through a maximum of 16 layers in downlink is limited to a maximum of 8 layers, a throughput is reduced. Also, in the case of uplink, since only half of reception paths transmitted to the fronthaul port #1 is supported, it brings about an effect that uplink coverage is substantially reduced. However, the DU 160 and the RU 180 may again present the cell service to the terminal despite the fronthaul failure. Also, the DU 160 may easily recover from the fronthaul failure by the mapping operation of the DU between the layer and the RU port, without a change of the O-RAN standard.

In FIG. 8, the DU may detect a failure of fronthaul. The DU may identify another fronthaul port in response to the detecting of the failure of the fronthaul. The DU may map a layer to another fronthaul port. Here, a call drop may occur due to the time from detection to mapping. To compensate for a service delay caused by the call drop, methods of FIG. 9 to FIG. 10 described later may be utilized.

Figure 9:
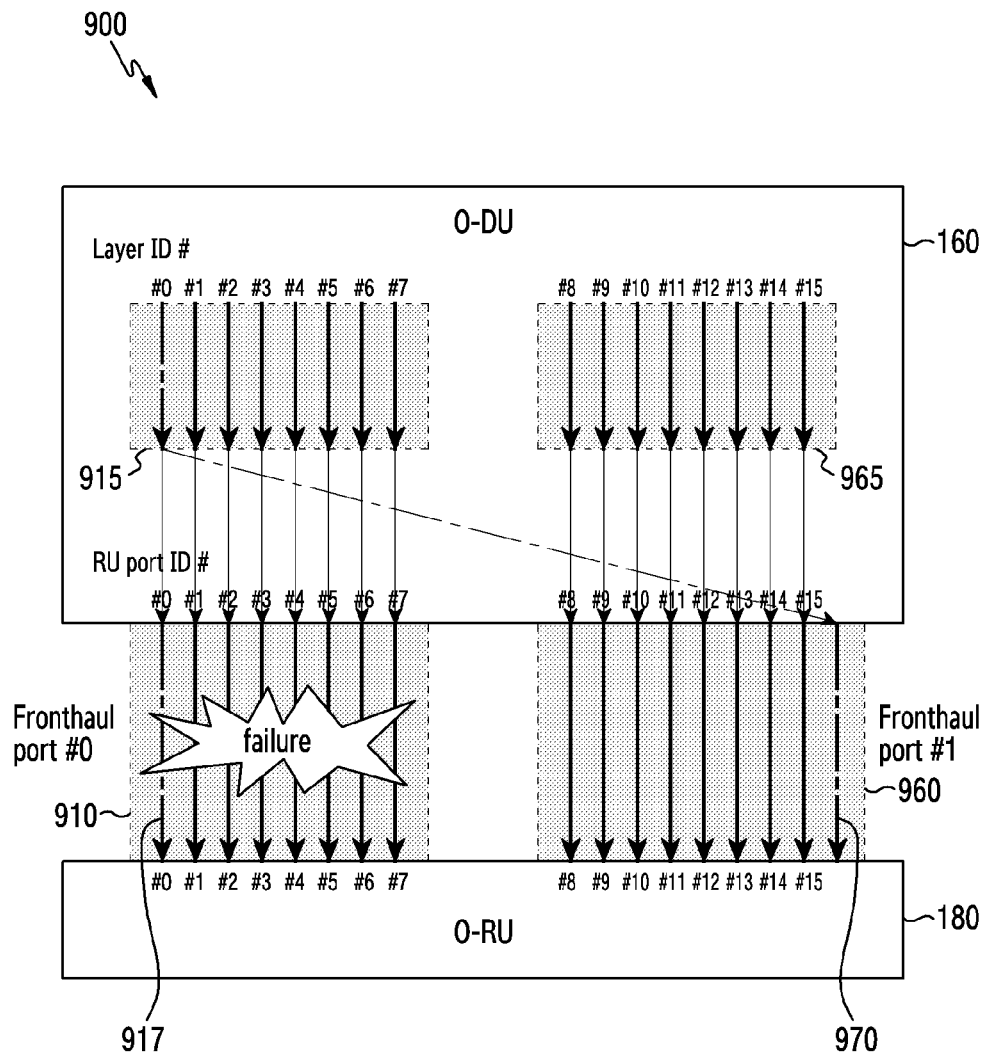
FIG. 9 illustrates an example of a fronthaul port-based redundancy transmission according to an embodiment of the disclosure.

FIG. 9 illustrates an example of a fronthaul port-based redundancy transmission according to an embodiment of the disclosure.

Referring to FIG. 9, in example 900 of a fronthaul port-based redundancy transmission, an operation of, in preparation for down of a fronthaul port #0, redundantly transmitting a stream corresponding to an endpoint of a default layer of the fronthaul port #0 through another fronthaul port is described. Such redundancy transmission may be referred to as fronthaul port diversity, layer redundancy transmission, access layer redundancy, dual transmission, or fronthaul port multiplexing transmission. In FIG. 9, a fronthaul port #1 is exemplified as a port for preparing the fronthaul port #0 in a situation in which two fronthauls are configured between a DU and an RU, but embodiments of the disclosure are not limited thereto. An operation of redundantly transmitting a corresponding layer in a fronthaul port (e.g., a fronthaul port #2) different from the fronthaul port #0 in a situation in which three or more fronthauls are configured between the DU and the RU may be also understood as an embodiment of the disclosure.

Referring to FIG. 9, a plurality of fronthaul ports may be configured between the DU 160 and the RU 180. As an example, the RU 180 may be the O-RU of category B of FIG. 4 for MIMO. The plurality of fronthaul ports may include a fronthaul port #0 (910) and a fronthaul port #1 (960). The fronthaul port refers to a physical path along a fronthaul interface between the DU 160 and the RU 180. The fronthaul port may include one or more layer paths.

A failure may occur in the fronthaul port #0 (910). After the failure occurs in the fronthaul port #0 (910), when mapping between a layer and an RU port is performed, a delay may occur. When the delay is longer than a predetermined time, a call drop of a cell may occur. To minimize a problem caused by the mapping delay, in the disclosure, a fronthaul port-based redundancy transmission scheme is described in which the default layer is redundantly transmitted through another fronthaul port.

According to an embodiment, in preparation for down of the fronthaul port #0 (910), the DU 160 may map an endpoint of the first layer, that is, the default layer, to the fronthaul port #1 (960) of the DU. The DU 160 may redundantly transmit the default layer through the fronthaul port #1 (960) as well as the fronthaul port #0 (910). In this case, a margin of a fronthaul bandwidth for a redundancy transmission of a layer is required for the fronthaul port #1 (960). This is because again setting a mapping between a layer of the fronthaul port #1 (960) and an RU port may cause an overhead of the resetting. A procedure in which the DU 160 identifies a margin of another fronthaul port (e.g., the fronthaul port #1 (960)) may also be understood as an embodiment of the disclosure. According to an embodiment, when the margin does not exist, the DU 160 may not perform the operation of FIG. 9 or may perform the operation of FIG. 8. According to an embodiment, when the margin exists, the DU 160 may additionally allocate an RU port for the sake of the default layer.

The DU 160 may transmit the default layer to the RU 180 for each fronthaul port. The DU 160 may redundantly transmit the default layer to the RU 180 through the fronthaul port #1 (960) other than the fronthaul port #0 (910). By redundantly transmitting cell connection related information, that is, an RU port corresponding to the first antenna port between a terminal and an RU and a corresponding stream, the cell connection of the terminal may be maintained, even if a failure occurs in any one fronthaul port. Thereafter, the DU 160 may detect a failure in the fronthaul port #0.

According to an embodiment, redundancy transmission may require additional setting of an RU. This is because, according to the existing setting, a processing element corresponds to one endpoint in a one-to-one relationship, but has to change into one-to-many correspondence due to the redundancy transmission. The DU 160 may set additional information to the RU 180, in addition to the existing link setting. The additional information may be configured to map an additional processing element with a current endpoint. For example, the DU 160 may map a layer ID #0 of FIG. 9 to an additional RU port 970 other than RU 180 port ID #0. A link between the layer ID #0 and the RU port ID #0 may be referred to as a primary link, and a link between the layer ID #0 and the additional RU port 970 may be referred to as a secondary link. The DU 160 may set the RU 180 to provide the secondary link. According to an embodiment, the DU 160 may set one or more secondary links to the RU 180.

The DU 160 may redundantly transmit the layers through the links set to the RU 180. The RU 180 may decode each layer. The RU 180 may obtain information decoded according to section information from the primary link and information decoded according to section information from the secondary link for each resource block (RB). The RU 180 may compare each decoded information. The RU 180 may determine whether the primary link and the secondary link are redundant according to the comparison result. When the primary link and the secondary link are redundant, the RU 180 may use the information transmitted from the primary link. When the primary link and the secondary link are redundant, the RU 180 may ignore the information transmitted from the secondary link. As another example, the RU 180 may discard the information transmitted from the secondary link. As further example, the RU 180 may store, in a buffer, the information transmitted from the secondary link. When a failure occurs in a fronthaul port associated with the primary link, the RU 180 cannot receive data from the primary link with the DU 160. When there is no data delivered from the primary link, the RU 180 may use the decoded information from the secondary link.

The DU 160 may maintain a DL service through the fronthaul port #1 even if a failure is detected in the fronthaul port #0. Among layers (e.g., the layer IDs #0 to #7 (915)) corresponding to the existing fronthaul port #0 (910), a default layer with a layer ID #0 is delivered to the RU 180 through the additional RU port 970. That is, even if RU port #0 (917) is not activated, since the additional RU port 970 has been activated, a cell service may be maintained. Meanwhile, the presenting of other layers (e.g., the layer IDs #1 to #7) may be stopped. Due to a layer order, the presenting of layers (e.g., the layer IDs #8 to #15 (965)) corresponding to the fronthaul port #1 (960) may also be stopped. Here, the layers may be streams corresponding to a control plane message or a user plane message. As such, in the case of downlink, since only a stream being based on a default layer is transmitted, a throughput is reduced. Also, in the case of uplink, since only half of reception paths transmitted to the fronthaul port #1 is supported, it brings about an effect in which uplink coverage is substantially reduced. However, despite the failure of the fronthaul port, the DU 160 and the RU 180 may present a cell service to a terminal without a delay.

In FIG. 9, it is illustrated that one default layer is transmitted redundantly, but embodiments of the disclosure are not limited thereto. When a bandwidth margin of another fronthaul port is sufficient, the DU may redundantly transmit not only the default layer (e.g., the layer ID #0) but also an additional layer (e.g., the layer ID #1). For example, the DU may transmit a specified number of layers redundantly. For another example, the DU may transmit the layers redundantly, by a number corresponding to a margin of a fronthaul bandwidth detected.

Figure 10:
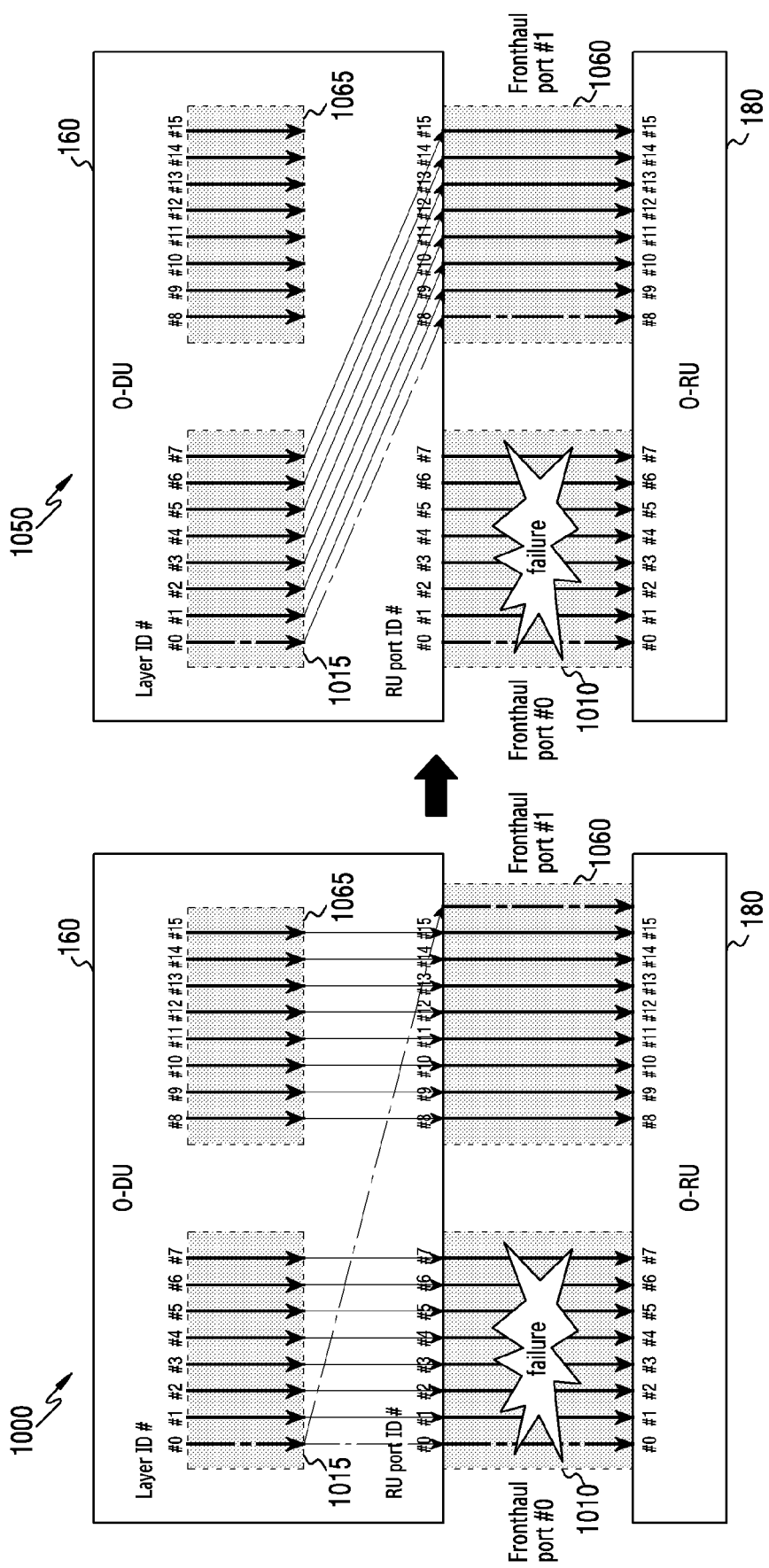
FIG. 10 illustrates an example of a fronthaul port-based redundancy transmission and a fronthaul port recovery according to an embodiment of the disclosure.

FIG. 10 illustrates examples of a fronthaul port-based redundancy transmission and a fronthaul port recovery according to an embodiment of the disclosure.

In FIG. 9, when a failure of a fronthaul port occurs during multi-layer transmission, because only default layer transmission is performed, there was a problem in that a throughput is reduced. To compensate for this, in FIG. 10, a fronthaul port-based redundancy transmission 1000, similar to the fronthaul port-based redundancy transmission illustrated in FIG. 9, and a fronthaul port recovery 1050 mapping the layers presented from the fronthaul port #0 to the endpoints of the fronthaul port #1, similar to the fronthaul port recovery illustrated in FIG. 8, are described together. The descriptions of FIG. 8 and FIG. 9 may be applied to a description of embodiments of FIG. 10 in the same or similar scheme. Also, in FIG. 10, a fronthaul port #1 is exemplified as a port for preparing a fronthaul port #0 in a situation in which two fronthauls are configured between a DU and an RU, but embodiments of the disclosure are not limited thereto. An operation of redundantly transmitting a corresponding layer in a fronthaul port (e.g., a fronthaul port #2) different from the fronthaul port #0 in a situation in which three or more fronthauls are configured between the DU and the RU may be also understood as an embodiment of the disclosure.

Referring to FIG. 10, a plurality of fronthaul ports may be configured between a DU 160 and an RU 180. As an example, the RU 180 may be the O-RU of category B of FIG. 4 for MIMO. The plurality of fronthaul ports may include a fronthaul port #0 (1010) and a fronthaul port #1 (1060). The fronthaul port refers to a physical path along a fronthaul interface between the DU 160 and the RU 180. The fronthaul port may include one or more layer paths.

A failure may occur in the fronthaul port #0 (1010). After the failure occurs in the fronthaul port #0 (1010), a delay may occur, when mapping between a layer and an RU port is performed. When the delay is longer than a predetermine time, a call drop of a cell may occur. To minimize a problem caused by the mapping delay, the DU 160 may transmit a default layer to the RU 180 for each fronthaul port, as shown in FIG. 9.

The DU 160 may maintain a DL service through the fronthaul port #1 even if the failure is detected in the fronthaul port #0. Among layers (e.g., layer IDs #0 to #7 (1015)) corresponding to the existing fronthaul port #0 (1010), a default layer with a layer ID #0 is delivered to the RU through an additional RU port. Thereafter, as shown in FIG. 8, the DU 160 may map other layers (e.g., the layer IDs #1 to #7) to the fronthaul port #1 (1060). Here, the layers may be streams corresponding to a control plane message or a user plane message. The DU 160 may map layers (e.g., the layer IDs #0 to #7 (1015)) corresponding to the existing fronthaul port #0 (1010) among the layers received from an upper layer, to endpoints of the fronthaul port #1. According to this mapping, it may be difficult to service layers (e.g., layer IDs #8 to #15 (1065)) corresponding to the fronthaul port #1 (1060). Like earlier methods, according to the method shown in FIG. 10, a throughput is reduced in downlink, and coverage is reduced in uplink. However, despite the failure of the fronthaul port, the DU 160 and the RU 180 may present a cell service to a terminal without a delay. Also, the throughput reduction is temporary, and the DU may restore a session while maintaining a call between the RU and a terminal.

In FIGS. 7 10, the O-RU of category B has been illustrated, but embodiments of the disclosure are not limited thereto. To exemplify a situation in which a plurality of layers are activated, the O-RU of category B has been merely exemplified, and embodiments of the disclosure are also applicable to the O-RU of category A.

Through FIGS. 8 to 10, an operation of presenting a cell service by using another fronthaul port when a failure occurs in a fronthaul port or operations of redundantly transmitting an important layer in advance in preparation for this failure have been described. Since each method has advantages and disadvantages, in some embodiments, the DU may be configured to select a fronthaul multiplexing method, based on at least one of a cell state, a DU capability, an RU capability, a channel state, and a load of the DU and the RU. According to an embodiment, the standard needs to be changed for the redundancy transmission of the default layer, so capability information is required. When the RU supports the redundancy transmission, the DU may transmit the default layer for each fronthaul port through the methods of FIGS. 9 to 10. Also, according to an embodiment, when the presented service is less sensitive to a delay (e.g., a requirement for a delay time is equal to or less than a predetermined value), the DU may map the default layer to another fronthaul port when a failure of a fronthaul port is detected, through the method of FIG. 8.

Although the disclosure exemplifies a situation in which two fronthaul ports are deployed between the DU and the RU, embodiments of the disclosure are not limited thereto. It is undoubted that embodiments of the disclosure may be applied not only to the two fronthaul ports, but also when three or more fronthaul ports are deployed between the DU and the RU.

According to embodiments of the disclosure, the RU may transmit the capability information to the DU. According to an embodiment, the RU may transmit the capability information for indicating whether to support redundancy, as information, to the DU. Here, redundancy refers to a fronthaul diversity method through the redundancy transmission mentioned in FIG. 9 and FIG. 10. The capability information may be transmitted through a management plane message (e.g., yet another new generation (YANG) model).

TABLE 1

```
module: o-ran-module-cap
+--rw module-capability
+--ro ru-capabilities
| +--ro ru-supported-category?
<---------------omitted---------------->
| +--ro dynamic-transport-delay-management-supported boolean
| +--ro support-only-unique-ecpri-seqid-per-eaxc? boolean
| +--ro coupling-methods
| | +--ro coupling-via-frequency-and-time? boolean
| | +--ro coupling-via-frequency-and-time-with-priorities? Boolean
| | +--ro coupling-via-frequency-and-time-with-priorities-optimized? boolean
| +--ro ud-comp-len-supported? Boolean
| +--ro redundancy-supported? Boolean
+--ro band-capabilities* [band-number]
| +--ro band-number uint16
```

When the RU supports redundancy, processing elements for multiplexing may be added as shown in Table 2 below.

TABLE 2

```
module: o-ran-uplane-conf
+---rw user-plane-configuration
   +--rw low-level-tx-links* [name]
   | +--rw name string
   | +--rw processing-element -> /o-ran-pe:processing-elements/ru-elements/name
   | +--rw processing-elements-redundancy* -> /o-ran-pe:processing-elements/ru-elements/name
      | +--rw tx-array-carrier -> /user-plane-configuration/tx-array-carriers/name
      | +--rw low-level-tx-endpoint -> /user-plane-configuration/low-level-tx-endpoints/name
   +--rw low-level-rx-links* [name]
   | +--rw name string
   | +--rw processing-element -> /o-ran-pe:processing-elements/ru-elements/name
      | +--rw rx-array-carrier -> /user-plane-configuration/rx-array-carriers/name
      | +--rw low-level-rx-endpoint -> /user-plane-configuration/low-level-rx-endpoints/name
   | +--rw user-plane-uplink-marking? -> /o-ran-pe:processing-elements/enhanced-uplane-mapping/uplane-mapping/up-marking-name
```

As shown in Table 2, processing elements for multiplexing may be added to user plane configuration information of a management plane. '*' stands for a list. The processing elements may be added as many as the number of multiplexed ports. According to an embodiment, a port for multiplexing may exist only in a transmission direction (i.e., a DL TX direction).

According to embodiments of the disclosure, a method performed by a distributed or digital unit (DU) in a wireless communication system may include transmitting one or more data streams of a message of a control plane or a user plane, which correspond to one or more layers, to a radio unit (RU) through a first fronthaul port, and transmitting a data stream corresponding to an access layer, which is the first layer used for connection of a cell among the one or more layers, to the RU through a second fronthaul port configured between the DU and the RU.

According to an embodiment, the access layer may be mapped to an additional RU port of the second fronthaul port, and the additional RU port may be different from RU ports allocated for layers of the message in the second fronthaul port.

According to an embodiment, the method may further include detecting a failure of the first fronthaul port, and in response to the detecting of the failure of the first fronthaul port, identifying the second fronthaul port, and mapping a layer other than the access layer among the one or more layers to the RU ports of the second fronthaul port.

According to an embodiment, transmitting the access layer to the RU may include detecting a failure of the first fronthaul port, and in response to the detecting of the failure of the first fronthaul port, identifying the second fronthaul port, and mapping the access layer to an RU port of the second fronthaul port.

According to an embodiment, the method may further include mapping a layer other than the access layer among the one or more layers to the RU port of the second fronthaul port.

According to an embodiment, the access layer may correspond to the lowest layer ID among layer IDs of the DU.

According to an embodiment, the access layer may be related with at least one of a master information block (MIB) of the cell, a physical downlink control channel (PDCCH), a synchronization signal/physical broadcast channel (SS/PBCH) synchronization signal block (SSB), a physical downlink shared channel (PDSCH) of the first layer, a cell-specific reference signal (CRS) of the first port, and a channel state information-reference signal (CSI-RS) of the first port.

According to an embodiment, the access layer may be a layer mapped to an RU port having the lowest identifier (ID) among the one or more layers.

According to embodiments of the disclosure, a method performed by a radio unit (RU) in a wireless communication system may include receiving one or more data streams of a message of a control plane or a user plane, which correspond to one or more layers, from a distributed or digital unit (DU) through a first fronthaul port, and receiving a data stream corresponding to an access layer, which is the first layer used for connection of a cell among the one or more layers, from the DU through a second fronthaul port configured between the DU and the RU.

According to an embodiment, the access layer may be associated with an additional RU port of the second fronthaul port, and the additional RU port may be different from RU ports allocated for layers of the message in the second fronthaul port.

According to an embodiment, the method may further include obtaining first information by decoding the data stream delivered from the first fronthaul port, obtaining second information by decoding the data stream delivered from the second fronthaul port, and when redundancy is identified based on the comparison result of the first information and the second information, transmitting a message being based on the first information to a terminal.

According to an embodiment, receiving the access layer from the DU may include, in response to detecting of a failure of the first fronthaul port, decoding the data stream corresponding to the access layer, which is delivered from the second fronthaul port.

According to an embodiment, the method may further include decoding a data stream corresponding to a layer other than the access layer received through the RU port of the second fronthaul port among the one or more layers.

According to an embodiment, the access layer may correspond to the lowest layer ID among layer IDs of the DU.

According to an embodiment, the access layer may be related to at least one of a master information block (MIB) of the cell, a physical downlink control channel (PDCCH), a synchronization signal/physical broadcast channel (SS/PBCH) synchronization signal block (SSB), a physical downlink shared channel (PDSCH) of the first layer, a cell-specific reference signal (CRS) of the first port, and a channel state information-reference signal (CSI-RS) of the first port.

According to an embodiment, the access layer may be a layer mapped to an RU port having the lowest identifier (ID) among the one or more layers.

According to embodiments of the disclosure, a device of a distributed or digital unit (DU) in a wireless communication system may include at least one transceiver, and at least one processor. The at least one transceiver may be configured to transmit one or more data streams of a message of a control plane or a user plane, which correspond to one or more layers, to a radio unit (RU) through a first fronthaul port, and transmit a data stream corresponding to an access layer that is the first layer used for connection of a cell among the one or more layers, to the RU through a second fronthaul port configured between the DU and the RU.

According to an embodiment, the access layer may be mapped to an additional RU port of the second fronthaul port, and the additional RU port may be different from RU ports allocated for layers of the message in the second fronthaul port.

According to an embodiment, the at least one processor may be further configured to detect a failure of the first fronthaul port, and in response to the detecting of the failure of the first fronthaul port, identify the second fronthaul port, and map a layer other than the access layer among the one or more layers to RU ports of the second fronthaul port.

According to an embodiment, the at least one processor may be configured to, in order to transmit the access layer to the RU, detect a failure of the first fronthaul port, and in response to the detecting of the failure of the first fronthaul port, identify the second fronthaul port, and map the access layer to an RU port of the second fronthaul port.

According to an embodiment, the at least one processor may be further configured to map a layer other than the access layer among the one or more layers to the RU port of the second fronthaul port.

According to an embodiment, the access layer may correspond to the lowest layer ID among layer IDs of the DU.

According to an embodiment, the access layer may be related to at least one of a master information block (MIB) of the cell, a physical downlink control channel (PDCCH), a synchronization signal/physical broadcast channel (SS/PBCH) synchronization signal block (SSB), a physical downlink shared channel (PDSCH) of the first layer, a cell-specific reference signal (CRS) of the first port, and a channel state information-reference signal (CSI-RS) of the first port.

According to an embodiment, the access layer may be a layer mapped to an RU port having the lowest identifier (ID) among the one or more layers.

According to embodiments of the disclosure, a device of a radio unit (RU) in a wireless communication system may include at least one transceiver, and at least one processor. The at least one transceiver may be configured to receive one or more data streams of a message of a control plane or a user plane, which correspond to one or more layers, from a distributed or digital unit (DU) through a first fronthaul port, and receive a data stream corresponding to an access layer, which is the first layer used for connection of a cell among the one or more layers, from the DU through a second fronthaul port configured between the DU and the RU.

According to an embodiment, the access layer may be associated with an additional RU port of the second fronthaul port, and the additional RU port may be different from RU ports allocated for layers of the message in the second fronthaul port.

According to an embodiment, the at least one processor may be further configured to obtain first information by decoding the data stream delivered from the first fronthaul port, and obtain second information by decoding the data stream delivered from the second fronthaul port. The at least one transceiver may be further configured to, when redundancy is identified based on the comparison result of the first information and the second information, transmit a message being based on the first information to a terminal.

According to an embodiment, the at least one processor may be configured to, in order to receive the access layer from the DU, in response to detecting of a failure of the first fronthaul port, decode a data stream corresponding to the access layer, which is delivered from the second fronthaul port.

According to an embodiment, the at least one processor may be further configured to decode a data stream corresponding to a layer other than the access layer received through the RU port of the second fronthaul port among the one or more layers.

According to an embodiment, the access layer may correspond to the lowest layer ID among layer IDs of the DU.

According to an embodiment, the access layer may be related to at least one of a master information block (MIB) of the cell, a physical downlink control channel (PDCCH), a synchronization signal/physical broadcast channel (SS/PBCH) synchronization signal block (SSB), a physical downlink shared channel (PDSCH) of the first layer, a cell-specific reference signal (CRS) of the first port, and a channel state information-reference signal (CSI-RS) of the first port.

According to an embodiment, the access layer may be a layer mapped to an RU port having the lowest identifier (ID) among the one or more layers.

Methods of the embodiments described in claims or specification of the disclosure may be implemented in the form of hardware, software, or a combination of hardware and software.

When the methods are implemented in software, a computer-readable storage medium storing one or more programs (software modules) may be presented. The one or more programs stored in the computer-readable storage medium are configured to be executable by one or more processors in an electronic device. The one or more programs include instructions for allowing the electronic device to execute methods of embodiments described in the claims or specification of the disclosure.

Such programs (software modules and/or software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of other form, or a magnetic cassette. Or, the programs may be stored in a memory composed of a combination of some or all of them. Also, each composed memory may be included as a plurality as well.

Also, the program may be stored in an attachable storage device that may be accessed through a communication network such as the Internet, an intranet, a local area network (LAN), a wide area network (WAN) or a storage area network (SAN), or a communication network consisting of a combination thereof. This storage device may be connected to a device implementing an embodiment of the disclosure through an external port. Also, a separate storage device on the communication network may be connected to a device implementing an embodiment of the disclosure as well.

In the specific embodiments of the disclosure described above, components included in the disclosure have been expressed in the singular or plural according to the specific embodiments presented. However, the singular or plural expression is appropriately selected for the context presented for description's convenience sake, and the disclosure is not limited to the singular or plural component, and even if a component is expressed in a plural, it may be composed of a singular, or even if the component is expressed in a singular, it may be composed of a plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a distributed unit (DU) in a wireless communication system, the method comprising:
transmitting, to a radio unit (RU) through a first fronthaul port, one or more data streams including a first data stream corresponding to an access layer, which is a first layer among one or more layers used for connection of a cell, and one or more second data streams of a message of a control plane or a user plane, which correspond to one or more other layers; and
transmitting, to the RU through a second fronthaul port configured between the DU and the RU, the first data stream corresponding to the access layer.

2. The method of claim 1,
wherein the access layer is mapped to an additional RU port of the second fronthaul port, and
wherein the additional RU port is different from RU ports allocated for layers of the message in the second fronthaul port.

3. The method of claim 2, further comprising:
detecting a failure of the first fronthaul port; and
in response to detecting the failure of the first fronthaul port, identifying the second fronthaul port and mapping a layer other than the access layer among the one or more layers to the RU ports of the second fronthaul port.

4. The method of claim 1, further comprising:
detecting a failure of the first fronthaul port; and
in response to detecting the failure of the first fronthaul port, identifying the second fronthaul port,
wherein the access layer is mapped to an RU port of the second fronthaul port.

5. The method of claim 4, further comprising:
mapping a layer other than the access layer among the one or more layers to the RU port of the second fronthaul port.

6. The method of claim 1, wherein the access layer corresponds to a lowest layer ID among layer IDs of the DU.

7. The method of claim 1, wherein the access layer is related with at least one of a master information block (MIB) of the cell, a physical downlink control channel (PDCCH), a synchronization signal/physical broadcast channel (SS/PBCH) synchronization signal block (SSB), a physical downlink shared channel (PDSCH) of the first layer, a cell-specific reference signal (CRS) of the first fronthaul port, or a channel state information-reference signal (CSI-RS) of the first fronthaul port.

8. A method performed by a radio unit (RU) in a wireless communication system, the method comprising:
receiving, from a distributed unit (DU) through a first fronthaul port, one or more data streams including a first data stream corresponding to an access layer, which is a first layer among one or more layers used for connection of a cell, and one or more second data streams of a first message of a control plane or a user plane, which correspond to one or more other layers; and
receiving, from the DU through a second fronthaul port configured between the DU and the RU, a first data stream corresponding to the access layer.

9. The method of claim 8,
wherein the access layer is associated with an additional RU port of the second fronthaul port, and
wherein the additional RU port is different from RU ports allocated for layers of the first message in the second fronthaul port.

10. The method of claim 9, further comprising:
obtaining first information by decoding a data stream delivered from the first fronthaul port;
obtaining second information by decoding a data stream delivered from the second fronthaul port; and in response to redundancy being identified based on a comparison result of the first information and the second information, transmitting, to a terminal, a second message based on the first information.

11. The method of claim 8, further comprising:
in response to detecting a failure of the first fronthaul port, decoding the first data stream corresponding to the access layer, which is delivered from the second fronthaul port.

12. The method of claim 11, further comprising:
decoding a data stream corresponding to a layer other than the access layer received through an RU port of the second fronthaul port among the one or more layers.

13. The method of claim 8, wherein the access layer corresponds to a lowest layer ID among layer IDs of the DU.

14. The method of claim 8, wherein the access layer is related to at least one of:
 a master information block (MIB) of the cell;
 a physical downlink control channel (PDCCH);
 a synchronization signal/physical broadcast t channel (SS/PBCH) synchronization signal block (SSB);
 a physical downlink shared channel (PDSCH) of the first layer;
 a cell-specific reference signal (CRS) of the first fronthaul port; or
 a channel state information-reference signal (CSI-RS) of the first fronthaul port.

15. A device of a distributed unit (DU) in a wireless communication system, the device comprising:
 at least one transceiver; and
 at least one processor communicatively coupled to the at least one transceiver,
 wherein the at least one processor is configured to:
  transmit, to a radio unit (RU) through a first fronthaul port, one or more data streams including a first data stream corresponding to an access layer, which is a first layer among one or more layers used for connection of a cell, and one or more second data streams of a message of a control plane or a user plane, which correspond to one or more other layers, and
  transmit, to the RU through a second fronthaul port configured between the DU and the RU, the first data stream corresponding to the access layer.

16. The device of claim 15,
wherein the access layer is mapped to an additional RU port of the second fronthaul port, and
wherein the additional RU port is different from RU ports allocated for layers of the message in the second fronthaul port.

17. The device of claim 16, wherein the at least one processor is further configured to:
 detect a failure of the first fronthaul port,
 in response to detecting the failure of the first fronthaul port, identify the second fronthaul port, and
 map a layer other than the access layer among the one or more layers to RU ports of the second fronthaul port.

18. The device of claim 15, wherein the at least one processor is further configured to:
 detect a failure of the first fronthaul port,
 in response to detecting the failure of the first fronthaul port, identify the second fronthaul port, wherein the access layer is mapped to an RU port of the second fronthaul port, and
 transmit the mapped access layer to the RU.

19. The device of claim 18, wherein the at least one processor is further configured to:
 map a layer other than the access layer among the one or more layers to the RU port of the second fronthaul port.

20. The device of claim 15, wherein the access layer corresponds to a lowest layer ID among layer IDs of the DU.

* * * * *